Dec. 30, 1924.
1,520,724
O. SCHNEIDER
ELECTRODE OF ACCUMULATORS
Filed Dec. 8, 1919
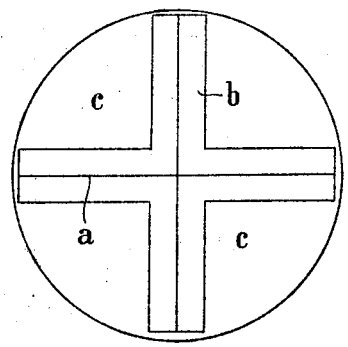
Inventor:
Otto Schneider
by C. P. Goepel
his attorney Patented Dec. 30, 1924.

1,520,724

UNITED STATES PATENT OFFICE.

OTTO SCHNEIDER, OF DRESDEN, GERMANY.

ELECTRODE OF ACCUMULATORS.

Application filed December 8, 1919. Serial No. 343,445.

(GRANTED UNDER THE PROVISIONS OF THE ACT OF MARCH 3, 1921, 41 STAT. L., 1313.)

*To all whom it may concern:*

Be it known that I, OTTO SCHNEIDER, a subject of Saxonia, Germany, and residing at Dresden, 22 Dürerplatz, Germany, have invented certain new and useful Improvements in Electrodes of Accumulators (for which I filed application in Germany Nov. 3, 1917, Patent No. 317,089), of which the following is a specification.

The present invention relates to improvements in electrodes for accumulators and has for an object to improve the construction of storage cells or accumulators in which the outer electrode envelops or extends entirely about the inner electrode which is provided with arms extending outwardly from a central body or connection and which arms constitute plates of the cell.

Heretofore the outer electrodes have been made in the form of a cylinder so that the plates of the outer electrode were in the form of arcuate members situated remotely from the radiating plates of the inner electrode.

Another object of the invention is to construct the outer electrode with plates which lie substantially parallel but in close proximity to the plates of the inner electrode to the end that the capacity of the cell may be increased and a better action had.

In the drawing, the figure represents a top plan view of a battery jar showing the inner and outer electrodes in place therein.

The drawing represents only one embodiment of the invention it being understood that the invention is susceptible of taking numerous other mechanical forms.

Referring more particularly to the drawings, 1 designates a battery jar of a usual construction and 2 represents the plates of the inner electrode which radiate from a central hub or connecting portion 3. The plates 2 are shown to be four in number but it is of course, obvious that they can be provided in more or less numbers as desired.

In accordance with prior constructions, the outer electrode was simply made in the form of a cylinder of such diameter as to fit within the outer jar 1 and about the outer ends of the plates 2. However, in accordance with the present invention the outer electrode is constructed with plates 4 which extend substantially parallel and close to the plates 2 of the inner electrode, so that their surfaces are juxtaposed for better electrolytic action.

The plates 4 are joined together as indicated at 5 at their inner ends where they extend at substantially right angles to each other and at their outer ends they are connected by bridging pieces 6 which extend between the edges of the plates 2 in the battery jar 1.

The electrolyte may freely flow between the plates and in the enlarged spaces 7 outside of the plates 4, these last mentioned spaces providing ample opportunity for measuring the specific gravity of the acid and rendering it unnecessary to pour out a sample of the acid for this purpose.

In view of the foregoing, it will be understood that the capacity of the accumulator is considerably increased by reason of the greater area of the plates 2 and 4 which are exposed to mutual electrolytic action and the invention thus provides an accumulator of greater current strength without materially adding to the weight of the same.

It is obvious that various changes and modifications may be made in the herein described embodiment of the invention without departing from the spirit of the invention.

I claim:

An accumulator of the character described comprising a jar for receiving an electrolyte, and a pair of irregularly shaped electrodes arranged within the jar with relatively large and extensive active faces, the outer electrode being hollow and conforming in shape to the inner electrode and closely spaced apart therefrom to obtain maximum electrolytic action.

In testimony whereof I affix my signature in presence of two witnesses.

OTTO SCHNEIDER.

Witnesses:
  WILHELM HANKE,
  WILHELM MEYER.